(12) United States Patent
Lee et al.

(10) Patent No.: US 7,132,633 B2
(45) Date of Patent: Nov. 7, 2006

(54) COMBINATION TOASTER MICROWAVE OVEN AND METHOD FOR OPERATING THE SAME

(75) Inventors: Byeong Yong Lee, Changwon-si (KR); Dong Hun Youn, Changwon-si (KR); Young Jin Oh, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/981,574

(22) Filed: Nov. 5, 2004

(65) Prior Publication Data

US 2005/0061806 A1 Mar. 24, 2005

Related U.S. Application Data

(62) Division of application No. 10/653,176, filed on Sep. 3, 2003.

(30) Foreign Application Priority Data

Sep. 3, 2002 (KR) .............. 10-2002-0052852
Sep. 3, 2002 (KR) .............. 10-2002-0052853

(51) Int. Cl.
*H05B 6/68* (2006.01)
*A47J 37/08* (2006.01)
*F24C 7/04* (2006.01)

(52) U.S. Cl. .............. 219/680; 219/685; 219/710; 219/719; 99/385; 99/451

(58) Field of Classification Search .......... 219/685, 219/680, 725, 739, 756, 762, 763, 386, 521, 219/413, 491, 494, 506, 720, 719, 710; 99/385, 99/325, 327, 399, 391–393, 451, DIG. 14
See application file for complete search history.

(56) References Cited

U.S. PATENT DOCUMENTS

| 5,126,536 | A | * | 6/1992 | Devlin | 219/497 |
| 5,128,521 | A | * | 7/1992 | Lanno et al. | 219/518 |
| 5,698,123 | A | * | 12/1997 | Tran | 219/492 |
| 5,802,957 | A | * | 9/1998 | Wanat et al. | 99/327 |
| 6,123,012 | A |   | 9/2000 | Hardin et al. |  |
| 6,539,840 | B1 | * | 4/2003 | Choi et al. | 219/702 |

FOREIGN PATENT DOCUMENTS

| JP | 62-125222 | 6/1987 |  |  |
| JP | 01-148505 | 10/1989 |  |  |
| JP | 01-305231 | 12/1989 |  |  |
| JP | 05-113223 | 5/1993 |  |  |
| JP | 6-141982 | * | 5/1994 | 99/342 |
| JP | 07-103490 | 4/1995 |  |  |
| JP | 09-075235 | 3/1997 |  |  |
| JP | 11-287459 | 10/1999 |  |  |

* cited by examiner

*Primary Examiner*—Philip H. Leung
(74) *Attorney, Agent, or Firm*—McKenna, Long & Aldridge

(57) ABSTRACT

Toaster cum microwave oven having a heater for toasting bread, including a memory for storing a voltage level to a heater according to the function of the toaster the user selects, a temperature sensor for sensing an inside temperature of the toaster, and a microcomputer for controlling a toasting time period according to a kind and a toasting level of bread the user selects, and an inside temperature of the toaster, and controlling the microwave oven according to a command received through the first key input part, thereby permitting toasting bread to a desired degree of toasting regardless of the inside temperature and continued user of the toaster.

7 Claims, 11 Drawing Sheets

COMBINATION TOASTER MICROWAVE OVEN AND METHOD FOR OPERATING THE SAME

This application is a Divisional of Application Ser. No. 10/653,176 filed Sep. 3, 2003, which is hereby incorporated by reference as if fully set forth herein.

This application claims the benefit of the Korean Application Nos. P2002-0052852 and P2002-0052853, two of which are filed on Sep. 3, 2002, which are hereby incorporated by reference.

BACKGROUND OF THE INVENTION

1. Field of the Invention

The present invention relates to microwave ovens, and more particularly, a toaster cum microwave oven, and a method for operating the same.

2. Background of the Related Art

In general, the microwave oven heats a heating object with a microwave oven. As shown in FIG. 1, a related art microwave oven is provided with a heating chamber 2 in a cavity assembly 1 for heating the heating object placed therein by applying the microwave thereto, and a door 4 for opening/closing the heating chamber 2.

There is an outfit chamber 10 at a side of the heating chamber 4, covered with an outer casing 6. The outfit chamber 10 is provided with a magnetron 12 for generating a microwave, a high voltage transformer 14 for applying a high voltage, and a fan (not shown) for forming an air flow that cools the electric components and passes through the heating chamber 2.

However, though the related art microwave oven, having different functions, can cook different food, there is no microwave oven that can toast bread, yet.

That is, because the related microwave oven having no heater can not toast bread at all, despite of the many functions of microwave oven, users can not but use separate toaster for simple toasting of bread, there are not only an expense for buying a toaster, but also inconvenience in use.

Under the foregoing reasons, a toaster cum microwave oven has been developed, which has a system as illustrated in FIG. 2.

Referring to FIG. 2, the related art toaster cum microwave oven is provided with a cavity assembly 20 having a cavity 22 formed therein, and an outfit chamber 23 at a side of the cavity 22. In the cavity 22, the object (food) is heated with a microwave. Different electronic components for generating the microwave oven are provided in the outfit chamber 23. The microwave oven illustrated in FIG. 2 is provided with a front plate 21.

There is a cavity door 24 for opening/closing the cavity 22. When the cavity door 24 is closed, the cavity door 24 is brought into contact with the front plate 21 to enclose the cavity 22. The cavity door 24 has a door handle 25 for the user to open/close the cavity door 24.

There is an outer case 27 covered on an upper part, sides of the cavity assembly 20 and the outfit chamber 23. There is a toaster 30 in the outfit chamber 23 in front of electronic components for generating the microwave. The toaster 30 is mounted through an opening in the front plate 21. There is a toaster panel 32 in front of the toaster 30. An outside of the toaster panel 32 is formed of a material the same with the cavity door 24. Therefore, the toaster panel 32 forms a smooth surface together with the cavity door 24.

The toaster 30 will be described in more detail. There are a plurality of fastening hooks (not shown) on a rear surface of the toaster panel 32, a toaster door 40 hinged on the toaster panel 32, and two trays 74 for supporting at least one sliced piece of bread.

There is a control panel 26 in an upper part of front surface of the cavity door 24, provided with a first selection part 26a for selecting functions of the microwave oven, and a second selection part 26b for selecting a toaster function, and a display part 26c for displaying an operation state for a key input at the first selection part 26a or the second selection part 26b.

According to this, the related art toaster cum microwave oven carries out a function of a signal received from the first or second selection part 26a or 26b of the control panel 26, for toasting the bread according to a kind of bread and a level of bread toasting the user selected.

However, the related art toaster cum microwave oven has a problem in that the bread is not toasted as the user desired because the bread is toasted only according to kind of bread and a level of bread toasting the user selected without taking an inside state of the toaster into account.

SUMMARY OF THE INVENTION

Accordingly, the present invention is directed to a toaster cum microwave oven, and a method for operating the same that substantially obviates one or more of the problems due to limitations and disadvantages of the related art.

An object of the present invention is to provide a toaster cum microwave oven, and a method for operating the same, in which bread is toasted to a level the user desires regardless of a toaster inside temperature and continued toasting.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the toaster cum microwave oven having a heater for toasting bread includes a first key input part for selecting a function of the microwave oven, a second key input part for selecting a function of the toaster, a memory for storing a voltage level to a heater according to the function of the toaster the user selects, a temperature sensor for sensing an inside temperature of the toaster, and a microcomputer for controlling a toasting time period according to a kind and a toasting level of bread the user selects, and an inside temperature of the toaster, and controlling the microwave oven according to a command received through the first key input part.

The microcomputer sets a first heating time period according to a function of the toaster the user selects, a second heating time period according to the inside temperature of the toaster, and a third time period according to the voltage level, and sets a toasting time period by combining the first, second, and the third time periods. The microcomputer compensates for an error to be caused by the inside temperature of the toaster sensed at the temperature sensing part.

In another aspect of the present invention, there is provided a method for operating a toaster cum microwave oven including the steps of selecting a function of the toaster, sensing an inside temperature of the toaster, (c) setting a toasting time period according to the selected function of the toaster, and the inside temperature of the toaster, and (d) toasting the bread for the set toasting time period.

After sensing the inside temperature of the toaster, the step of compensating for an error further includes the step of subtracting/adding a temperature from/to the sensed inside temperature according to a time period starting from a time point the toaster finishes operation to a time point the toaster starts operation again, for compensating for an error to be caused by the sensed inside temperature. Or alternatively, The step of compensating for an error further includes the step of increasing/reducing the toasting time period according to a time period starting from a time point the toaster finishes operation to a time point the toaster starts operation again, for compensating for an error to be caused by the sensed inside temperature.

The step (c) includes the steps of setting a first heating time period according to a function of the toaster the user selects, and a second heating time period according to the inside temperature of the toaster, and combining the first and second heating time periods for setting a toasting time period.

In further aspect of the present invention, there is provided a toaster cum microwave oven having a heater for toasting bread, including a first key input part for selecting a function of the microwave oven, a second key input part for selecting a function of the toaster according to a kind and a toasting level of bread, a memory for storing a voltage level to a heater according to the kind and the toasting level of bread the user selects, a time counter for counting a time period starting from an end of operation of the toaster to a re-start of the operation, and a microcomputer for controlling a heating time period of the heater according to the kind and a toasting level of bread the user selects, a voltage level, and a time period counted with the time counter, and controlling operation of the microwave oven according to a command received through the first key input part.

In still further aspect of the present invention, there is provided a method for operating a toaster cum microwave oven including the steps of selecting a function of the toaster according to a kind and a toasting level, (b) determining if the toaster is operated within a time period before the selection of a function of the toaster, (c) setting a toasting time period according to the user's selection of the function of the toaster, and a time period starting from a prior time point the toaster finishes operation to a time point the toaster starts operation again if the toaster is operated before, and (d) toasting the bread for the set toasting time period.

The step (c) includes the steps of setting a first heating time period according to a function of the toaster the user selects, and a second heating time period according to a time period starting from a prior time point the toaster finishes operation to a time point the toaster starts operation again, and combining the first and second heating time periods for setting a toasting time period.

The step (c) includes the steps of cooling down the inside of the toaster for a time period, sensing the inside temperature of the toaster, setting a first heating time period according to a function of the toaster the user selects, and a second heating time period according to a time period starting from a prior time point the toaster finishes operation to a time point the toaster starts operation again, and combining the first and second heating time periods for setting a toasting time period.

In still yet further aspect of the present invention, there is provided a method for operating a toaster cum microwave oven including the steps of selecting a function of the toaster according to a kind and a toasting level, (b) determining if the toaster is operated within a time period before the selection of a function of the toaster, (c) sensing an inside temperature of the toaster, (d) setting a toasting time period according to the user's selection of the function of the toaster, and the inside temperature of the toaster if the toaster is operated before, and (e) toasting the bread for the set toasting time period.

The method further includes the step of compensating for an error to be caused by the sensed inside temperature after the step (c). The step of compensating for an error further includes the step of subtracting/adding a temperature from/to the sensed inside temperature according to a time period starting from a time point the toaster finishes operation to a time point the toaster starts operation again, for compensating for an error to be caused by the sensed inside temperature. The step of compensating for an error further includes the step of increasing/reducing the toasting time period according to a time period starting from a time point the toaster finishes operation to a time point the toaster starts operation again, for compensating for an error to be caused by the sensed inside temperature.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings. In describing the embodiments, same parts will be given the same names and reference symbols, and repetitive description of which will be omitted.

First Embodiment

A toaster cum microwave oven in accordance with a first preferred embodiment of the present invention will be described.

Figure 1:
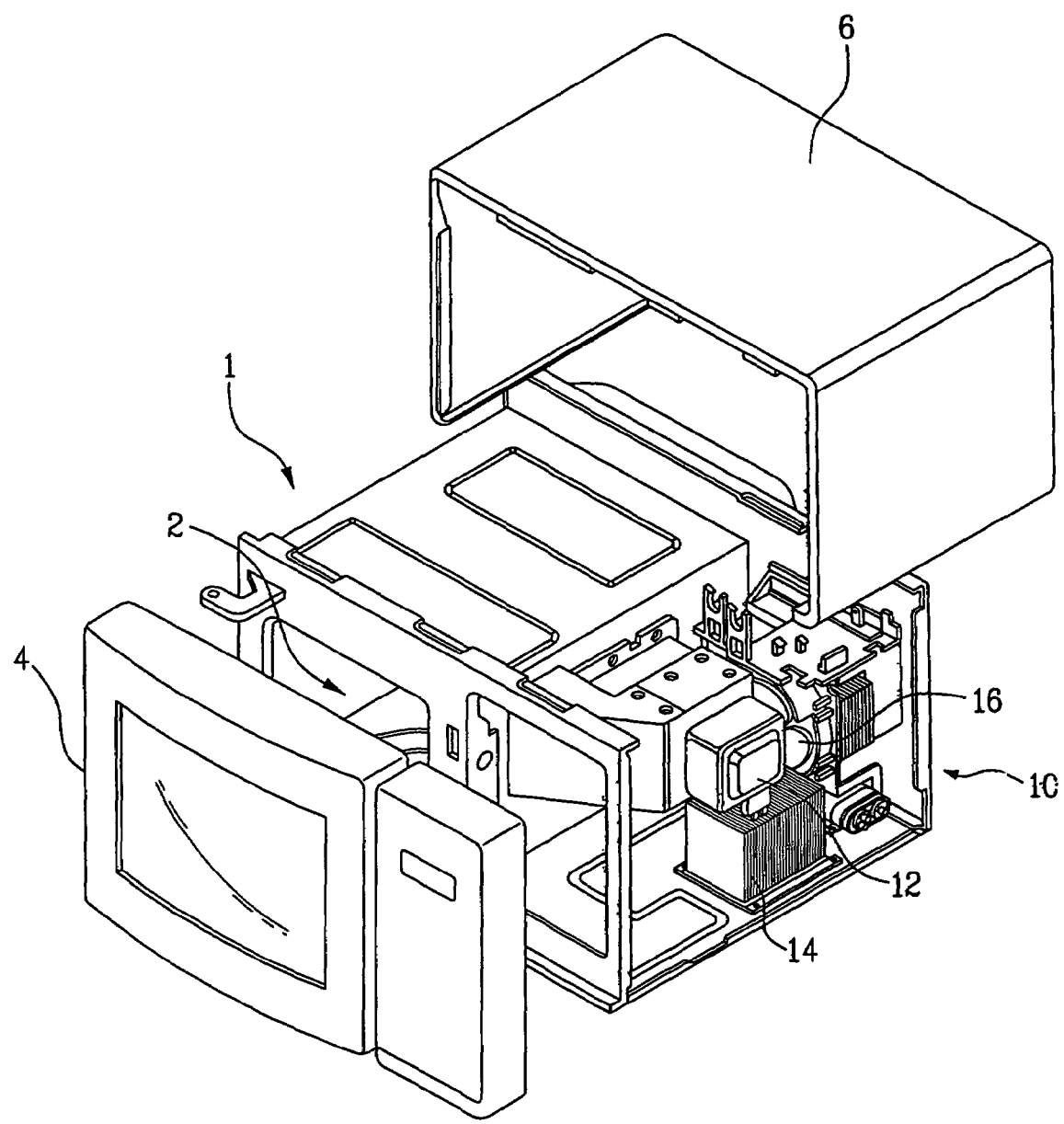
FIG. 1 illustrates a disassembled perspective view of a related art microwave oven.
Figure 2:
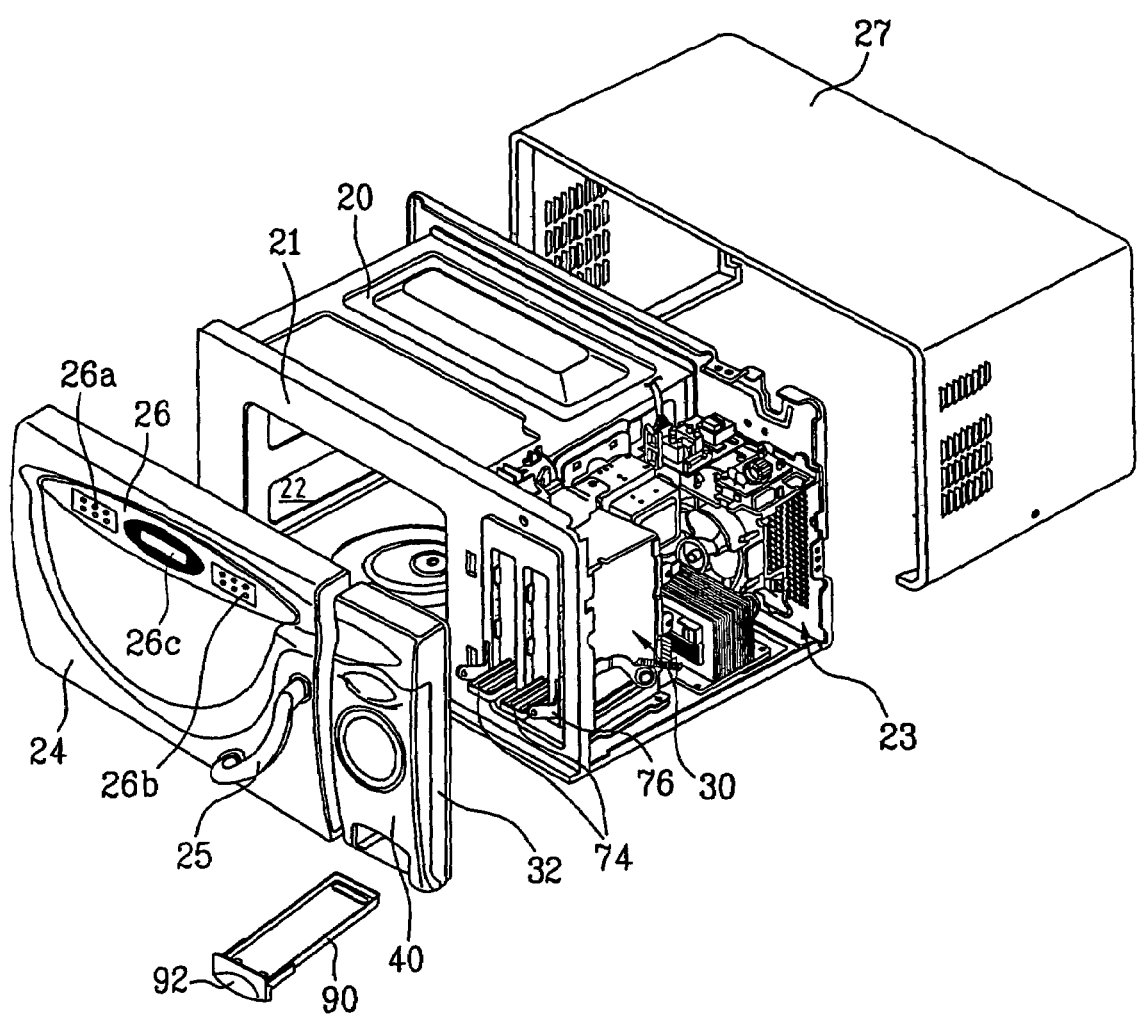
FIG. 2 illustrates a disassembled perspective view of a related art toaster cum microwave oven.
Figure 3:
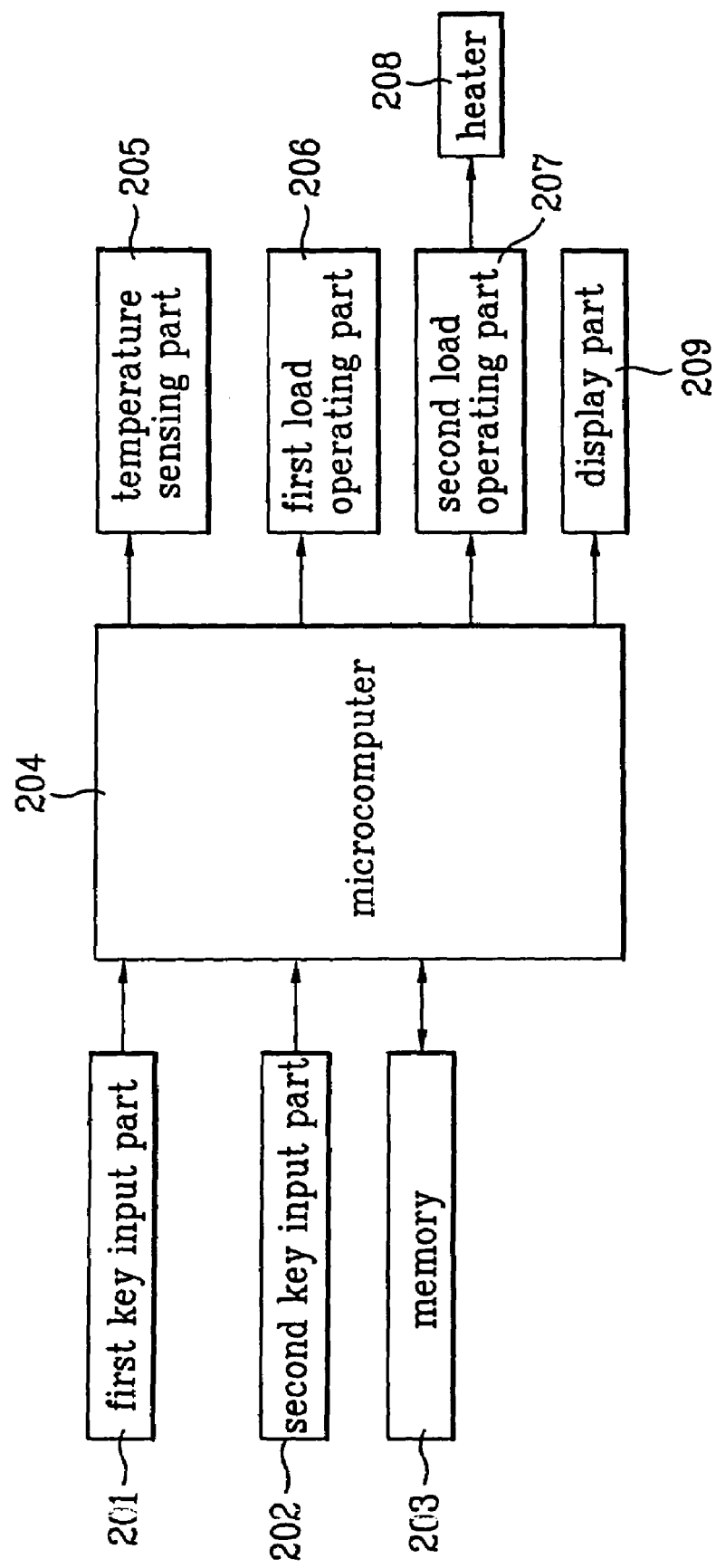
FIG. 3 illustrates a block diagram of a toaster cum microwave oven in accordance with a first preferred embodiment of the present invention.

Referring to FIG. 3, a control system of the toaster cum microwave oven includes a first key input part 201 for selecting different functions for operating the microwave oven, a second key input part 202 for selecting different menu for operating the toaster, and kind and level of toasting of bread, a memory 203 for storing a voltage level provided to a heater according to the kind and level of toasting of bread, a temperature sensor 205 for sensing an inside temperature of the toaster, a microcomputer 204 for controlling the toaster such that a heating time period of the bread is varied with kind and a toasting level of bread, a voltage level of toasting, the user selects, and an inside temperature of the toaster sensed through the temperature sensing part 205, and controlling operation of the microwave oven according to a command received through the first key input part 201, a first load operating part 206 for operating a load on the microwave oven in response to a control signal from the microcomputer 204 when a user's command is received through the first key input part 201, a second load operating part 207 for operating a load on the toaster in response to a control signal from the microcomputer 204 when a user's command is received through the second key input part 202, a heater 208 for being heated with a voltage from the second load operating part 207, and a display part 209 for displaying operation states of the microwave oven and the toaster in response to a control signal from the microcomputer 204.

When the user selects kind and a toasting level of bread through the second key input part 202, the toaster cum microwave oven sets a final time period of bread toasting by making a combination of a time period preset according to the kind and toasting level of bread, a heating time period according to an output voltage preset according to a toasting level of bread, and a heating time period preset according to an inside temperature of the toaster sensed through the temperature sensing part.

That is, it is required that a toasting time period of soft bread is different from hard bagel. Moreover, since the toasting level differs depending on users, the toasting time period is adjusted according to the toasting level. For an example, the toasting level is classified into 'rare', 'medium', and 'overdo', and the heating time period is set according to the class. Thus, the heating time period is set according to kind and toasting level of the bread, and information on the set heating time period is stored in the memory 203.

Since the voltage to the heater 207 differs depending on toaster manufacturers and toasting levels, the heating time period differs depending on the toaster manufacturers. For an example, when the voltage to the heater is relatively high, the heating time period is reduced, and when the voltage to the heater is low, the heating time period is long.

Moreover, since the inside temperature of the toaster is elevated, once the toaster is operated the heater 208 is heated quickly, and the bread is toasted within a short time period when the bread is toasted continuously. Therefore, the microcomputer 204 controls a heater heating time period according to the inside temperature sensed at the temperature sensing part 205. For an example, if the inside temperature is higher than a room temperature or a reference temperature, the heating time period is reduced by a predetermined amount.

Thus, the first embodiment toaster cum microwave oven set a toasting time period, taking a heating time period depending on kind of bread, a heating time period depending on a toasting level, a heating time period depending on the voltage to the heater 208, and a heating time period depending on a temperature sensed at the temperature sensing part 205 into account.

Though not shown, the first embodiment toaster cum microwave oven may further includes a fan for cooling the toaster, and a time counter for counting a time period starting from finish of toaster operation to a starting time of re-operation of the toaster.

Figure 4A:
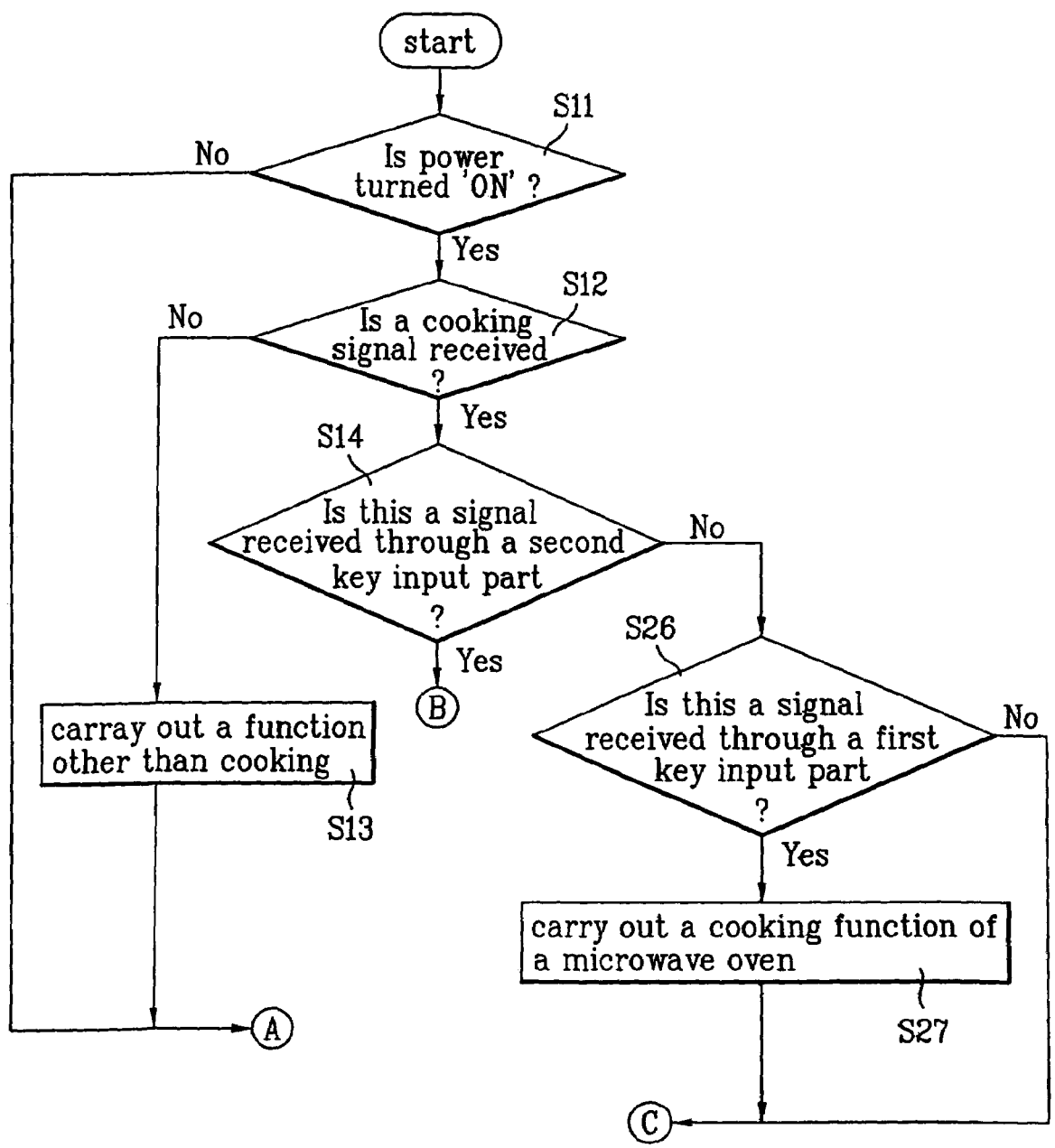
FIGS. 4A and 4B illustrate a flow chart showing the steps of a method for operating the toaster cum microwave oven in FIG. 3.
Figure 4B:
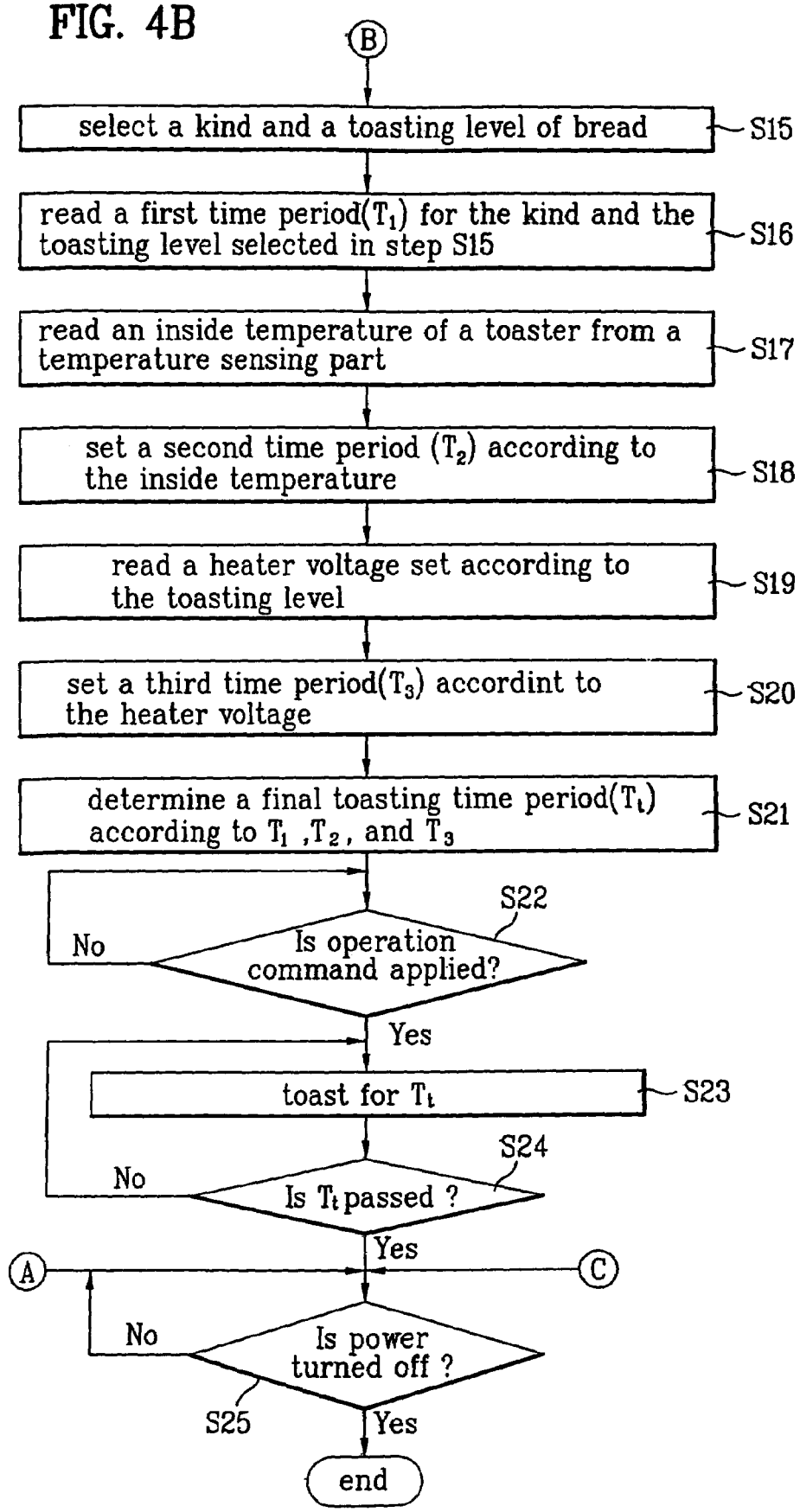

A method for operating the first embodiment toaster cum microwave oven of the present invention will be described. FIGS. 4A and 4B illustrate a flow chart showing the steps of a method for operating the toaster cum microwave oven in FIG. 3.

Referring to FIG. 4A, application of a power to the microwave oven is determined (S11). As a result of the determination in the step S11, if it is determined that the power is applied, application of a user's cooking signal is determined (S12).

As a result of the determination in the step S12, if it is determined that no user's cooking signal is applied, a function other than the cooking function, such as a timer reset, is carried out (S13). On the other hand, as a result of the determination in the step S12, if it is determined that the user's cooking signal is applied, it is determined whether the user applied a signal through the second key input part 202 for operating the microwave oven (S14).

As a result of the determination in the step S14, if the signal is applied through the second key input part 202, the microcomputer 204 knows that the user intends to operate the toaster. In this instance, as shown in FIG. 4B, the user selects kind and a toasting level of the bread (S15).

Then, detecting the kind and the toasting level of the bread the user selects through the second key input part 202, the microcomputer 204 reads a first set time period 'T1' for the kind and the toasting level of the bread from the memory 203 (S16).

Then, the microcomputer 204 reads the inside temperature of the toaster from the temperature sensing part 205 (S17). Then, the microcomputer 204 set a second time period T2, a heating time period for the inside temperature of the toaster (S18). For an example, the higher the inside temperature than a room temperature or a reference temperature, the shorter the second time period T2, the lower the inside temperature than a room temperature or a reference temperature, the longer the second time period T2.

The microcomputer 204 also reads a level of a voltage to be applied to the heater 208 according to a toasting level the user selects (S19).

Since a voltage level to be applied to the heater 208 for the same toasting level is set different between manufacturers, it is required that the heating time period is also set different between manufacturers. Therefore, the microcomputer 204 sets a third time period T3 according to a level of the voltage (S20). For an example, the higher the voltage level to the heater 208, the shorter the third time period T3, the lower the voltage level to the heater 208, the longer the third time period T3. An order for setting the first, second, and third time periods T1, T2, and T3 may be varied.

Then, the microcomputer 204 determines a final toasting time period Tt, i.e., an actual heater heating time period (S21) by combining the first, second, and third time periods T1, T2, and T3 set depending on selected kind and toasting level, the inside temperature of the toaster, and the voltage level of to be applied to the heater, respectively. There may be a variety of methods for determining the toasting time period Tt by using the first, second, and third time periods T1, T2, and T3. For an example, the toasting time period may be taken as an average of the first, second, and third time periods T1, T2, and T3. Or, alternatively, deviations of the first, second, and third time periods T1, T2, and T3 from a reference time period may be obtained, and the toasting time period Tt may be determined by using the deviations. Or, as another alternative, the toasting time period Tt may be determined by subtracting or adding the deviations of second and third time period T2 and T3 from/to the first time period T1, respectively. The third method may be expressed as the following equation (1).

$$Tt = T1 + (T2 - T2') + (T3 - T3') \quad (1)$$

Where, T2' denotes a heating time period for a reference temperature, and T3' denotes a heating time period for a reference voltage.

Once the toasting time period Tt is determined, application of user's cooking command is determined (S22). As a result of determination in the step S22, if the user's cooking command is applied, the toasting is carried out as long as Tt (S23).

Then, pass of the toasting time period Tt is determined (S24), if it is determined that the toasting time period Tt is passed, turn off of the power is determined (S25). If the power is turned off, all routines are completed.

On the other hand, as a result of the determination in the step S14, if no signal is applied through the second key input part 202, application of signal through the first key input part 201 is determined (S26). If the signal is applied through the first key input part 201, a cooking function of the microwave oven is carried out (S27).

Thus, the first embodiment toaster cum microwave oven of the present invention determines a toasting time period Tt, taking kind and toasting level of bread the user selects, a voltage level applied to the toaster, and an inside temperature sensed through the temperature sensing part into account.

Second Embodiment

A toaster cum microwave oven in accordance with a second preferred embodiment of the present invention will be described.

Figure 5:
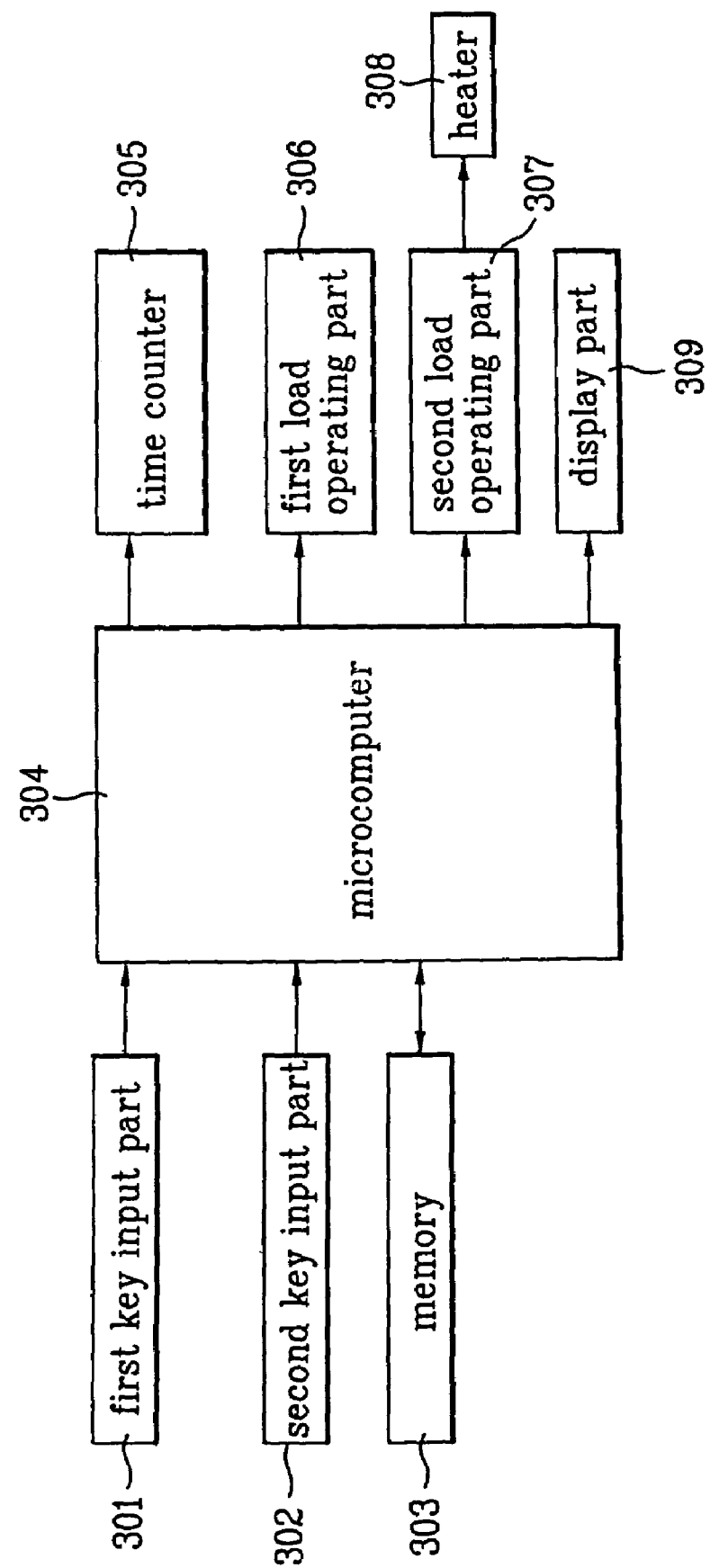
FIG. 5 illustrates a block diagram of a toaster cum microwave oven in accordance with a second preferred embodiment of the present invention.

Referring to FIG. 5, the toaster cum microwave oven includes a first key input part 301 for selecting different functions for operating the microwave oven, a second key input part 302 for selecting different menu for operating the toaster, and kind and level of toasting of bread, a memory 303 for storing a voltage level provided to a heater according to the kind and level of toasting of bread, a time counter 305 for counting a time period starting from an end of operation of the toaster to a re-start of the operation, a microcomputer 304 for controlling the toaster such that a heating time period of the bread is varied with kind and a toasting level of bread, a voltage level of toasting, the user selects, and a time period sensed through the time counter 305, and controlling operation of the microwave oven according to a command received through the first key input part 301, a first load operating part 306 for operating a load on the microwave oven in response to a control signal from the microcomputer 304 when a user's command is received through the first key input part 301, a second load operating part 307 for operating a load on the toaster in response to a control signal from the microcomputer 304 when a user's command is received through the second key input part 302, a heater 308 for being heated with a voltage from the second load operating part 307, and a display part 309 for displaying operation states of the microwave oven and the toaster in response to a control signal from the microcomputer 304.

Though not shown, the second embodiment toaster cum microwave oven may further includes a fan for cooling the toaster, and a temperature sensing part for sensing an inside temperature of the toaster.

Figure 6A:
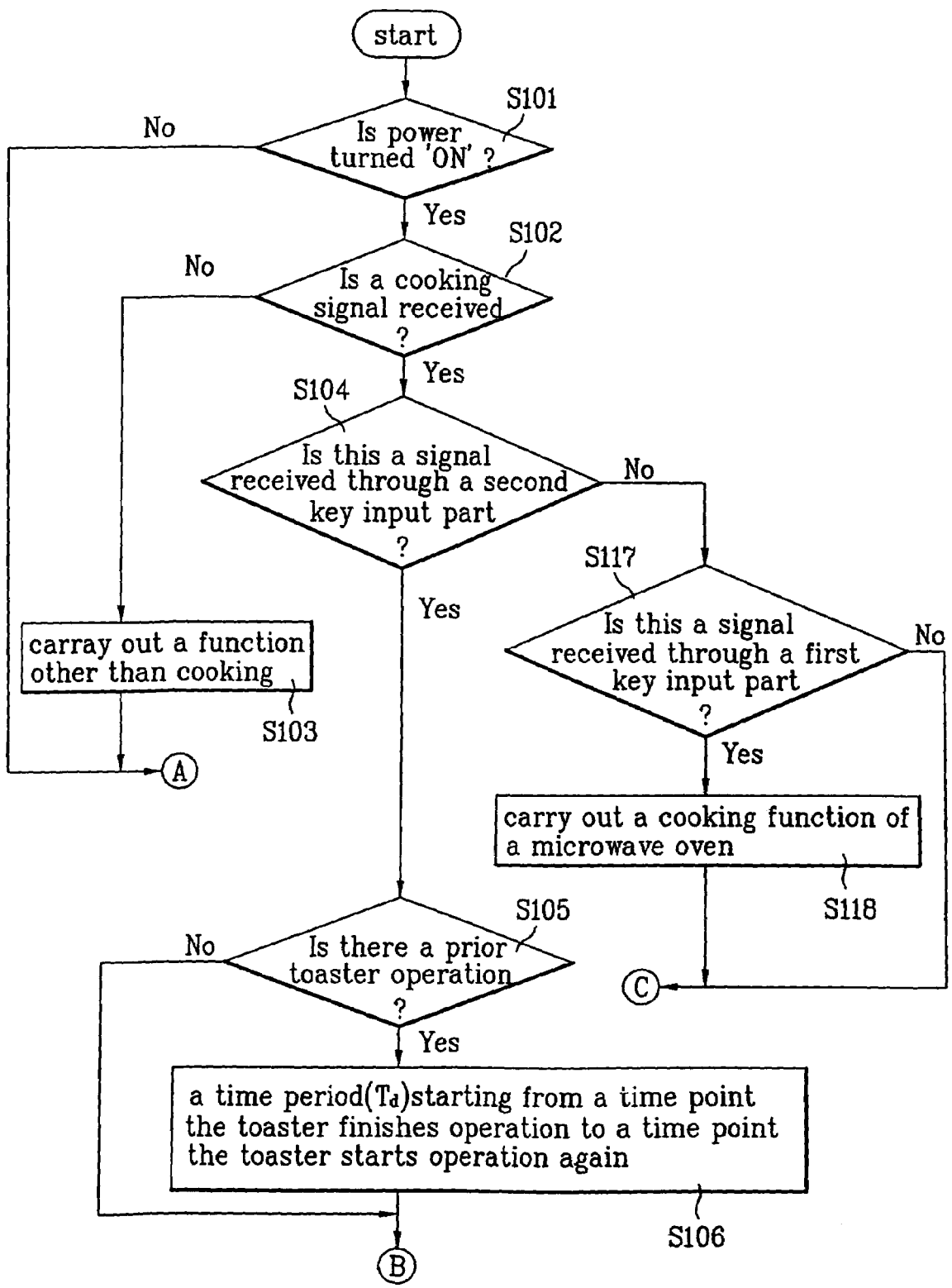
FIGS. 6A and 6B illustrate a flow chart showing the steps of a method for operating the toaster cum microwave oven in FIG. 5.
Figure 6B:
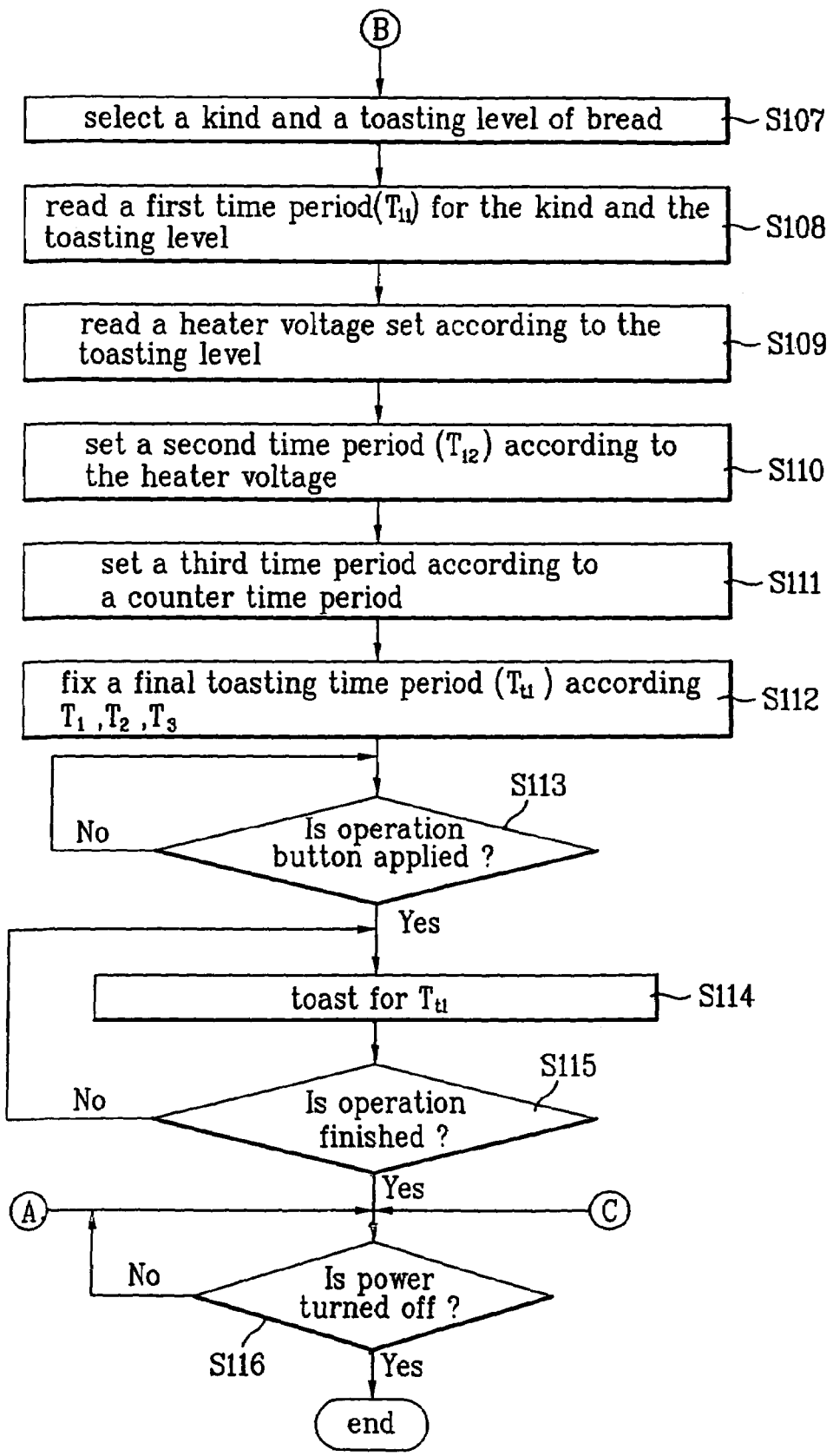

A method for operating the second embodiment toaster cum microwave oven of the present invention will be described. FIGS. 6A and 6B illustrate a flow chart showing the steps of a method for operating a toaster cum microwave oven.

Referring to FIG. 6A, application of a power to the microwave oven is determined (S101). As a result of the determination in the step S101, if it is determined that the power is applied, application of a user's cooking signal is determined (S102).

As a result of the determination in the step S102, if it is determined that no user's cooking signal is applied, a function other than the cooking function, such as a timer reset, is carried out (S103). On the other hand, as a result of the determination in the step S102, if it is determined that the user's cooking signal is applied, it is determined whether the user applies a signal through the second key input part 302 for operating the microwave oven (S104).

As a result of the determination in the step S104, if no signal is applied through the second key input part 302, the microcomputer 204 determines if a signal is applied through the first key input part 301. If a signal is applied through the first key input part 301, the microcomputer 204 carries out a cooking function of the microwave oven.

As a result of the determination in the step S104, if a signal is applied through the second key input part 302, the microcomputer 304 determines if the toaster is operated for a time period before (S105). This can be made by verifying application of a voltage to the heater 308 before.

As a result of the determination in the step S105, if it is determined that the toaster is operated before, the microcomputer 304 calculates a time period Td starting from a prior end of operation to re-starting of operation from the time counter 305. A time point of the re-starting of operation is the time point the user's command for operating the toaster is received.

Then, referring to FIG. 6b, after detecting the kind and the toasting time period of bread the user selects through the second key input part 302 (S107), the microcomputer 204 reads a first set time period 'T11' for the kind and the toasting level of the bread from the memory 303 (S108).

Then, the microcomputer 204 reads a voltage level to be provided to the heater 308 according to the toasting level the user selects (S109), and sets a second time period T12 according to the voltage level (S110). For an example, the higher the voltage level, the shorter the second time period T12, the lower the voltage level, the longer the second time period T12.

A third time period T13 is set according to the time period Td calculated in the step S106 (S111). A short time period Td from the prior end of operation to re-start of operation implies a short cool down time period of the heater 308. That is, the shorter the calculated time period Td, the higher the inside temperature of the toaster. Therefore, the shorter the calculated time period Td is, the shorter the third time period T13 is set, and the longer the calculated time period Td is, the longer the third time period T13 is set. An order for setting the first, second, and third time periods T11, T12, and T13 may be varied.

Then, the microcomputer 204 determines a final toasting time period Tt1, i.e., an actual heater heating time period (S112) by combining the first, second, and third time periods T11, T12, and T13. There may be a variety of methods for determining the toasting time period Tt1 by using the first, second, and third time periods T11, T12, and T13.

Once the toasting time period Tt1 is determined, application of user's cooking command is determined (S113). As a result of determination in the step S113, if the user's cooking command is applied, the toasting is carried out as long as Tt1 (S114).

Then, finish of toaster operation is determined (S115). This can be made by determining pass of the toasting time period Tt1. If it is determined that the toasting time period Tt is passed, turn off of the power is determined (S116). If the power is turned off, all routines are completed.

Thus, the second embodiment toaster cum microwave oven of the present invention determines a toasting time period Tt1, taking kind and toasting level of bread the user selects, a voltage level applied to the toaster, and a time period starting from a prior end of operation to a re-starting of operation into account.

Third Embodiment

A toaster cum microwave oven in accordance with a third preferred embodiment of the present invention will be described.

Figure 7:
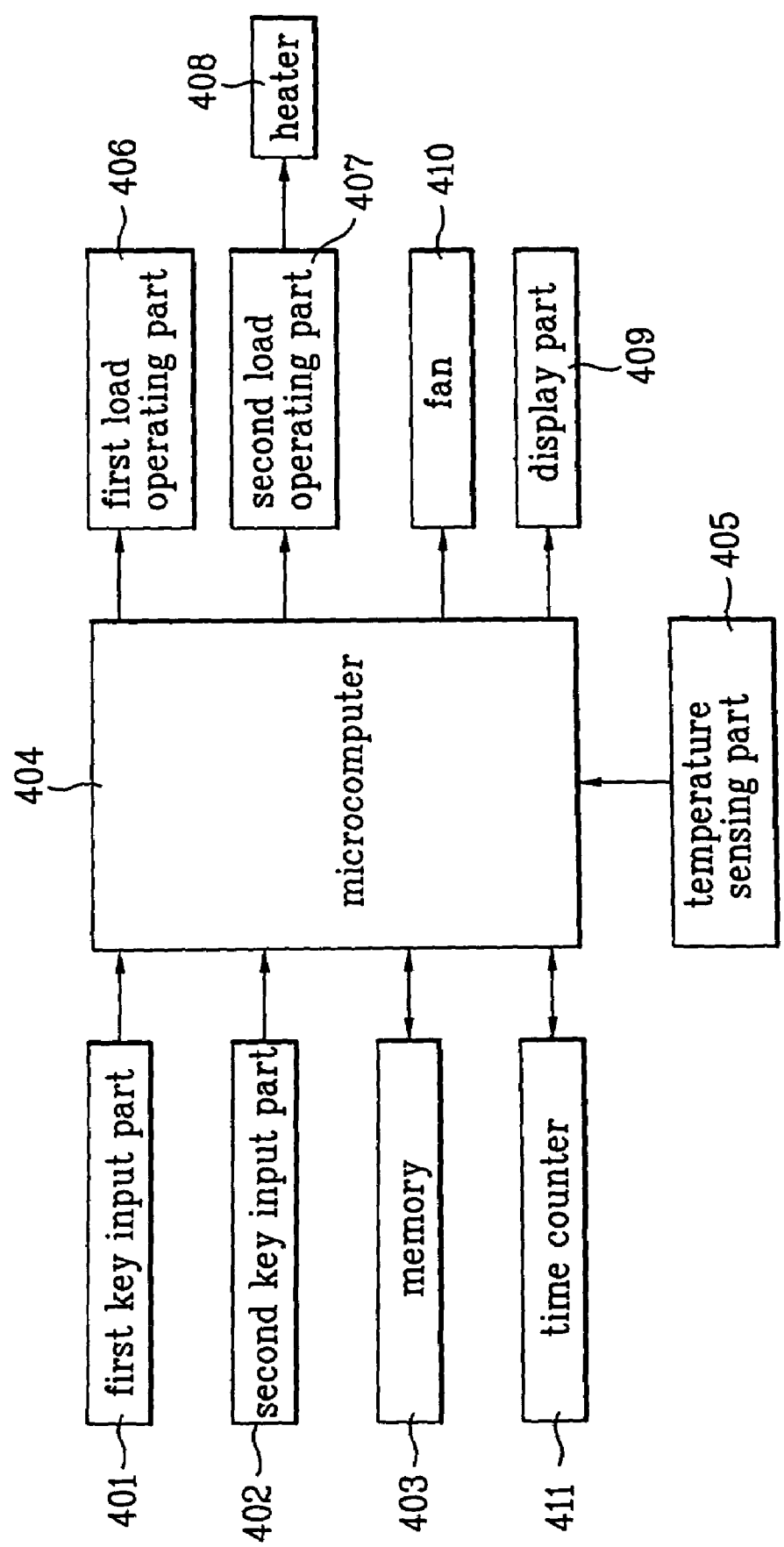
FIG. 7 illustrates a block diagram of a toaster cum microwave oven in accordance with a third preferred embodiment of the present invention.

Referring to FIG. 7, the toaster cum microwave oven includes a first key input part 401 for receiving an operation command for the microwave oven and selecting various menus, a second key input part 401 for receiving an operation command for the toaster and selecting various menus, a temperature sensing part 405 for sensing an inside temperature of the toaster in response to a toaster operation command received from a user through the second key input part, and a microcomputer 404 for controlling the toaster in response to a user's command received through the second key input part 402, and the microwave oven in response to a user's command received through the first key input part 401. The microcomputer 404 puts the fan 410 into operation for a time period when the toaster operation is finished, and compensates for a temperature difference according to a preset compensation condition depending on whether the temperature sensed at the temperature sensing part 405 is the same with a preset temperature, if a toaster operation command is received again through the second key input part 402 before pass of a preset time period.

The toaster cum microwave oven also includes a first load operating part 406 for operating a load on the microwave oven in response to a control signal from the microcomputer 404, a second load operating part 407 for operating a load on the toaster in response to a control signal from the microcomputer 404, a heater 408 for being operated in response to an operation signal from the second load operating part 407, a fan 410 for cooling down heat in the microwave oven and the toaster, a time counter 411 for counting an operation time period of the fan 410, a display part 409 for displaying operation states of the microwave oven and the toaster in response to a control signal from the microcomputer 404, and a memory 403 for storing voltage levels provided to a heater 408 according to the kind and level of toasting of bread.

When the user applies an operation command through the first key input part 401 of the second key input part 402, the toaster cum microwave oven provides a control signal for operating a pertinent load.

If the operation command is provided through the second key input part 402, an existence, and a time period, of toaster heating operation before application of the present operation command is determined. That is, it is determined if the operation command is an initial operation or not.

If there is a prior heating operation, a toasting condition will be set depending on a state of the toaster, and, if there is no a prior heating operation, it is determined that the operation is an initial operation, toasting is carried out according to a selected condition, and the fan 410 is driven for a preset time period if the operation is finished.

The user may apply a command for putting the toaster into operation again, while the fan 410 is operated after the heating operation of the toaster. If the command for putting the toaster into operation again is received, the microcomputer 404 reads the inside temperature of the toaster from the temperature sensing part 405, and adjusts a toasting condition according to the inside temperature of the toaster. However, the inside temperature of the toaster sensed during the cooling fan 410 is operated is lower than an actual temperature. Because the fan 410 discharges hot air in the toaster to outside of the toaster, the inside temperature of the toaster becomes low, temporarily. However, when the fan 410 stops, the inside temperature rises again, due to the heat remained in the heater 408. Therefore, there is a difference between the sensed temperature and the actual temperature.

For compensating for the temperature difference, a temperature compensating system or a time compensating system preset in advance is employed in a fabrication process. In the case of the temperature compensating system, the microcomputer 404 estimated a difference between the sensed inside temperature and the actual temperature, and the toasting time period is adjusted according to the estimated temperature difference. In the case of the time compensation system, the toasting time period is adjusted with a time period starting from a time point a toasting operation end to a time point operation command of the toaster is received again.

Figure 8A:
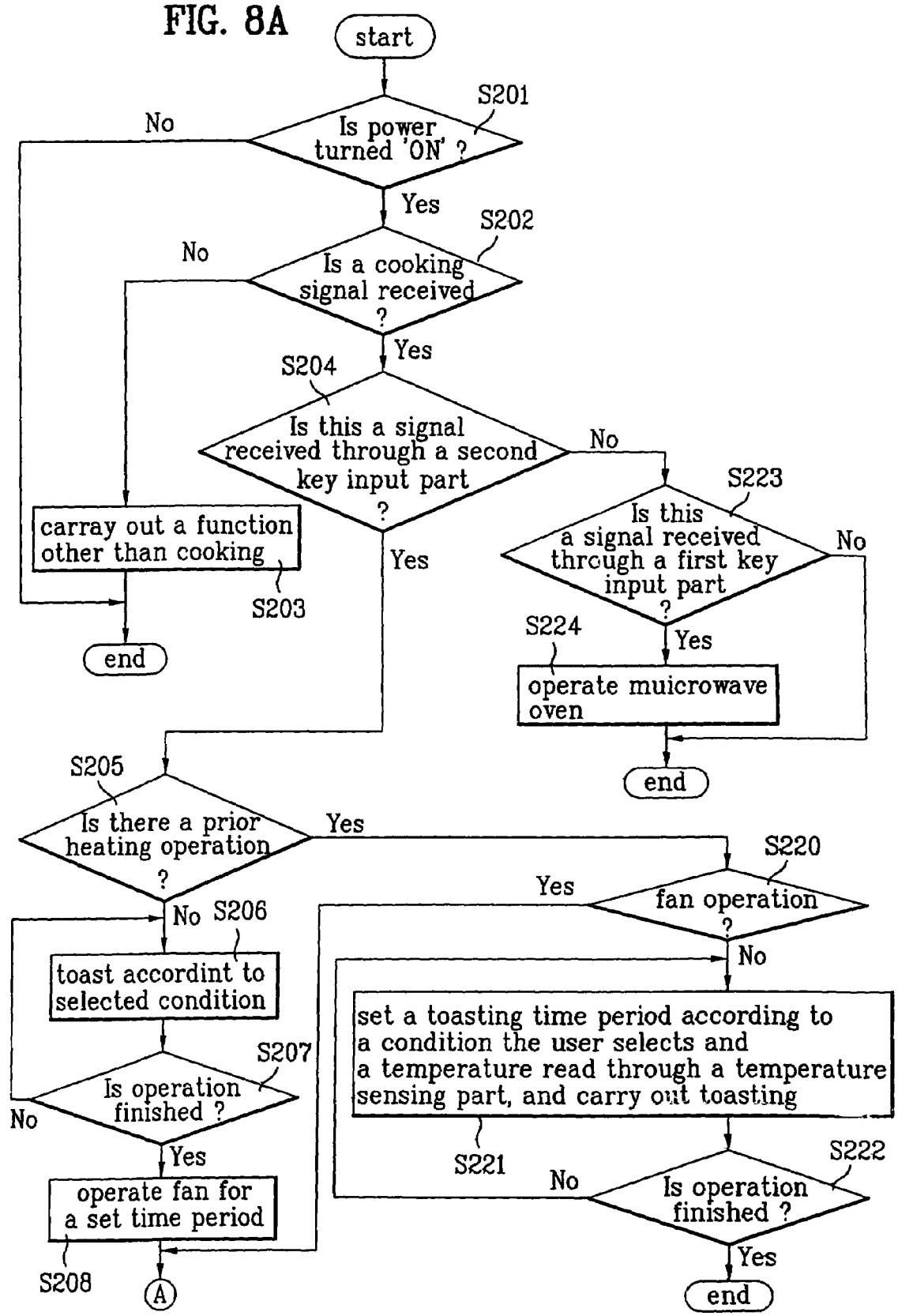
FIGS. 8A and 8B illustrate a flow chart showing the steps of a method for operating the toaster cum microwave oven in FIG. 7.
Figure 8B:
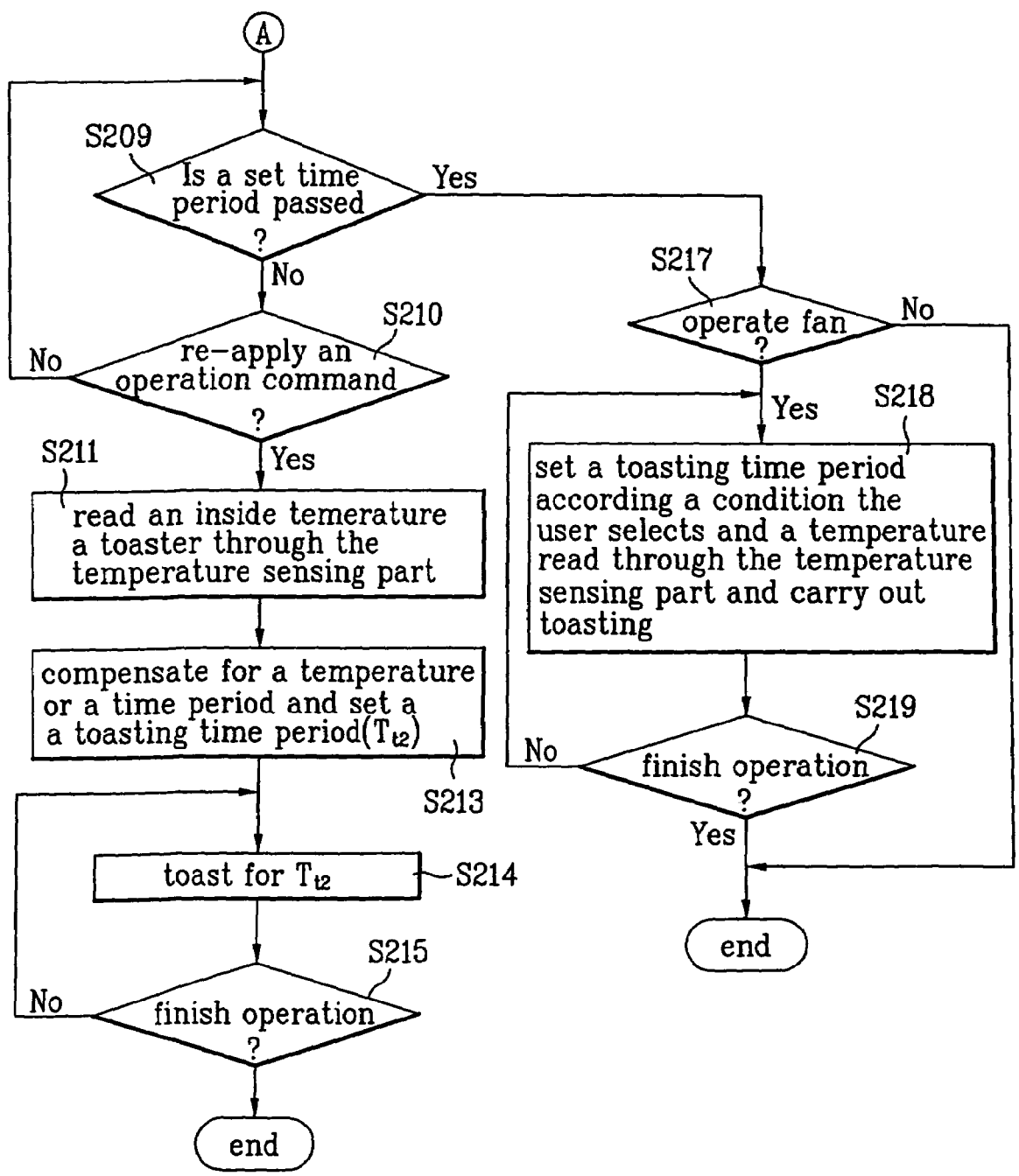

A method for operating the toaster cum microwave oven in accordance with a third preferred embodiment of the present invention will be described. FIGS. 8A and 8B illustrate a flow chart showing the steps of a method for operating the toaster cum microwave oven in FIG. 7.

Referring to FIG. 8A, application of a power to the microwave oven is determined (S201). As a result of the determination in the step S201, if it is determined that the power is applied, application of a cooking signal from a user is determined (S202).

As a result of the determination in the step S202, if it is determined that there is no application of a cooking signal from a user, a function other than the cooking, such as a timer reset is carried out. (S203). Opposite to this, as a result of the determination in the step S202, if it is determined that there is application of a cooking signal from a user, user's application of the signal through the second key input part 402 for operating the microwave oven is determined.

As a result of the determination in the step S204, if there is no user's application of the signal through the second key input part 402, application of a signal through the first key input part 401 is determined (S223). If the signal is received through the first key input part 401, a cooking function of the microwave oven is carried out (S228).

Opposite to this, as a result of the determination in the step S204, if there is application of the signal through the second key input part 402, the microcomputer 404 determines if there is a prior toaster operation or not (S205). This can be made by determining if there is application of a voltage before.

As a result of the determination in the step S205, if there is no prior heating operation, the operation is determined to be an initial operation, the toasting is carried out according to a toasting condition the user selects (S206). After finish of the step S206 is determined (S207), and, if finished, the fan 410 is operated for a preset time period for cooling down an inside of the toaster (S208).

Then, pass of the preset time period is determined (S209), and, as a result of the determination in the step S209, if the preset time is not passed yet, re-reception of the operation command is determined (S210).

As a result of the determination in the step S210, if the operation command is received again, an inside temperature (RT) of the toaster is reads through the temperature sensing part 405 (S211). Then, a toasting condition is set by making a temperature or time compensation according to a preset compensation condition (S213).

The temperature compensation process will be described.

When an operation command is received again in the middle of operation of fan after finish of toaster operation, there is a difference between the inside temperature (RT) the microcomputer 404 reads and an actual temperature because it is temporarily sensed that the temperature drops. Taking the temperature difference into account, the temperature compensation is made so that the microcomputer 404 detects an accurate temperature.

That is, the compensation temperature CT is subtracted/added from/to the sensed inside temperature RT, to fix a set temperature DT close to an actual temperature. By combining a heating time period T2 for the set temperature DT, the kind and the toasting level of bread, and a heating time period T1 for the voltage level, a toasting time period Tt2 is determined.

The compensation temperature CT is calculated from a time period Td starting from a time point the toaster finished operation to a time point the toaster starts operation again, or an operation time period of the fan 410. For an example, if an operation time period of the fan is long, the compensation temperature CT is set low, and if the operation time period of the fan is short, the compensation temperature CT is set high. Because, if the operation time period of the fan 410 long, the inside temperature to the toaster drops as much, and the heat of the heater 408 cools down, a small value of compensation temperature CT is subtracted from the sensed inside temperature RT. Opposite to this, if the operation time period of the fan 410 short, because the heat of the heater 408 can not be cooled much, a great value of compensation temperature CT is subtracted from the sensed inside temperature RT.

The time compensation process will be described.

For compensating for a difference between the inside temperature RT the microcomputer 404 reads and the actual temperature, a compensation time period dT is set for the difference between the sensed inside temperature RT and the actual temperature, and a toasting time period Tt2 is fixed by using the compensation time period dT. That is, the toasting time period Tt2 is fixed by combining the kind and toasting level of bread the user selects, a heating time period T1 for a voltage level, a heating time period T2 for the sensed inside temperature RT, and the compensation time period dT.

The compensation time period dT is calculated from a time period Td starting from a time point the toaster finishes operation to a time point the toaster starts operation again, or an operation time period of the fan 410. The short time period Td from a time point starting from an end of prior operation to a time point operation is started again, or the short operation time period of the fan 410 implies a short cooling down period of the heater 408 as much. In other words, the shorter the time period Td, the higher the inside temperature of the toaster. Therefore, the shorter the time period Td, the shorter the compensation time period dT, the longer the time period Td, the longer the compensation time period dT.

Once a toasting condition, such as toasting time period Tt2, is set by the temperature compensation or a time compensation in the step S213, toasting is carried out until the toasting is finished according to the set toasting condition (S214–S215).

As a result of the determination in the step S209, if the fan 410 is operated for a preset time period, after the fan 410 is stopped, re-reception of the operation command from the user is determined (S217). As a result of the determination in the step S217, if the operation command is received from the user again, the toasting time period is set according to the toasting condition the user selects and the temperature RT the temperature sensing part 405 reads, and toasting is carried out until toasting is finished (S218–S219).

As a result of the determination in the step S205, if there is heating operation before the operation command, it is determined if the fan 410 is in operation or not (S220). Then, as a result of operation in the step S220, if the fan 410 is not in operation presently, the toasting time period is set according to the toasting condition the user selects and the temperature RT the temperature sensing part 405 reads, and toasting is carried out until toasting is finished (S221–S222).

As has been described, since the toaster cum microwave oven, and method for operating the same sets a toasting time period taking an inside temperature of the toaster, and an idle time period into account, a state of toast the user desires can be provided, which improves satisfaction and reliability of user for the product.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A combined toaster and microwave oven comprising:
   a heater;
   a first input for selecting a toaster function, wherein the toaster function defines the type of food to be toasted and the desired toasting level;
   a memory for storing a voltage level, the voltage level being a function of a voltage to the heater set by a manufacturer and the selected toaster function;
   a counter for measuring the amount of time that has elapsed since the previous toaster operation; and
   a microcomputer for controlling a heating time period by combining a first, a second, and a third set time period, wherein the first set time period reflects the selected toaster function, the second set time period reflects the voltage level, and the third set time period reflects the elapsed period of time.

2. The combined toaster and microwave oven as claimed in claim 1, further comprising a temperature sensing part for sensing an inside temperature of the toaster.

3. A method for operating a combined toaster and microwave oven comprising the steps of:

selecting a toaster function according to the type of food to be toasted and a toasting level;

setting a first time period based on the type of food and the toasting level;

determining when the toaster was last operated;

setting a second time period based on an amount of time that has elapsed since the previous toasting operation;

setting a third time period based on a voltage level, the voltage level being a function of a voltage to a heater set by a manufacturer and the selected toaster function; and setting a toasting time period by combining the first, the second, and the third time periods.

4. The method as claimed in claim 3, wherein an increase in the amount of time that elapses since the previous operation correlates to an increase in the toasting time period.

5. The method as claimed in claim 3, further comprising:
cooling the inside of the toaster for a time period; and
sensing the inside temperature of the toaster.

6. A method for operating a combined toaster and microwave oven comprising:

selecting a toaster function according to the type of food being toasted and a toasting level;

reading a voltage level, the voltage level being a function of a voltage to a heater set by a manufacturer and the toaster function;

determining when the toaster was last operated;

sensing an inside temperature of the toaster as a result of the previous toaster operation;

setting a toasting time period according to set time periods corresponding to the toaster function, the voltage level, and the sensed inside temperature of the toaster.

7. A method for operating a combined toaster and microwave oven comprising:

setting a toaster function based on a type of food and a desired toasting level;

reading a voltage level, the voltage level being a function of a voltage to a heater set by a manufacturer and the toaster function;

sensing a temperature inside the toaster;

setting a toasting time period based on set time periods corresponding to the toaster function, the voltage level, and the inside temperature of the toaster; and adjusting the toasting time period based on an amount of time that has elapsed since a previous toaster operation.

* * * * *